US009825896B2

(12) United States Patent
Snider et al.

(10) Patent No.: US 9,825,896 B2
(45) Date of Patent: Nov. 21, 2017

(54) PROPOSED MESSAGE DISPOSITION VIEWPORT APPARATUS AND METHOD FOR TIMED OPERATION

(71) Applicant: Notion AI, Inc., Ann Arbor, MI (US)

(72) Inventors: Lindsay Snider, Ann Arbor, MI (US); Ian Berry, Ann Arbor, MI (US); Guy Suter, Ann Arbor, MI (US)

(73) Assignee: Notion AI, Inc., Ann Arbor, MI (US)

( * ) Notice: Subject to any disclaimer, the term of this patent is extended or adjusted under 35 U.S.C. 154(b) by 323 days.

(21) Appl. No.: 14/637,267

(22) Filed: Mar. 3, 2015

(65) Prior Publication Data
US 2015/0256498 A1    Sep. 10, 2015

Related U.S. Application Data

(60) Provisional application No. 61/947,894, filed on Mar. 4, 2014.

(51) Int. Cl.
*H04L 12/58* (2006.01)

(52) U.S. Cl.
CPC .............. *H04L 51/26* (2013.01); *H04L 51/22* (2013.01); *H04L 51/24* (2013.01); *H04L 51/36* (2013.01)

(58) Field of Classification Search
USPC ....... 709/207, 202–206, 217, 229, 223, 226, 709/228
See application file for complete search history.

(56) References Cited

U.S. PATENT DOCUMENTS

| 7,627,523 | B1* | 12/2009 | Symonds | ............... G06Q 20/10 705/39 |
| 9,241,070 | B1* | 1/2016 | Pycko | ................. H04M 3/5158 |
| 2002/0128033 | A1* | 9/2002 | Burgess | ................ G06F 1/3209 455/528 |
| 2005/0066070 | A1* | 3/2005 | Klassen | .................. G06F 15/02 710/1 |
| 2008/0132209 | A1* | 6/2008 | Willey | ............ H04M 1/274575 455/412.2 |
| 2010/0042570 | A1* | 2/2010 | Mayers | ................... H04L 12/58 706/46 |
| 2010/0287013 | A1* | 11/2010 | Hauser | ................ G06F 3/03543 705/7.37 |

(Continued)

*Primary Examiner* — Jude Jean Gilles
(74) *Attorney, Agent, or Firm* — Jeffrey Schox; Padowithz Alce

(57) ABSTRACT

A message post-processing apparatus provides an optional instrumented viewport to a message recipient to store message dispositions such as archive, reply-to, forward, open, move, delete, and each elapsed time-to-disposal (TTD) from display. The instrumented viewport also displays a proposed disposition and a proposed TTD, which may be overridden within the instrumented viewport. A timer is initialized to TDD when each message is substantially within the viewport. Absent user intervention, a disposer circuit performs the proposed operation on the message upon expiration of the TTD. The proposed TTD and disposition is derived from analyzing the history and quality of similar messages among recipient's dispositions. When a recipient changes the treatment of a message, the apparatus stores the new disposition and TTD for future reference. A synthesizer circuit transforms message body and headers and proposed TTD and disposition into a message précis.

17 Claims, 5 Drawing Sheets

(56) References Cited

U.S. PATENT DOCUMENTS

| | | | |
|---|---|---|---|
| 2011/0072084 A1* | 3/2011 | Kiyohara | H04L 41/0893 |
| | | | 709/204 |
| 2011/0072088 A1* | 3/2011 | Kiyohara | H04L 67/104 |
| | | | 709/205 |
| 2013/0222519 A1* | 8/2013 | Lee | H04N 7/15 |
| | | | 348/14.02 |
| 2014/0184919 A1* | 7/2014 | Yoshida | H04N 5/63 |
| | | | 348/725 |

* cited by examiner

PROPOSED MESSAGE DISPOSITION VIEWPORT APPARATUS AND METHOD FOR TIMED OPERATION

CROSS-REFERENCES TO RELATED APPLICATIONS

The present non-provisional application benefits from its currently provisional application Ser. No. 61/947,894 filed on 4 Mar. 2014 which is incorporated by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field
Electronic message processing and user interface devices.
Description of the Related Art Well known electronic means for communication such as email messaging are multiplying by text, voice messaging, tweets, short message service (sms), images, photos, sounds, which result in overloading their recipients.

It is known that some integrated email systems enable a sender to indicate the sender's importance of a message, but a recipient email client may not display the indicator and in a non-hierarchical relationship, the recipient may not echo the same priority.

And if there are numerous emails in an inbox to canvas, the recipient may take notice and operate on a first email that seems urgent and fail to anticipate a second email which is even more important or which lowers the priority of the first.

It is known that various methods and apparatus are available to determine and remove messages containing malicious content or unsolicited commercial messages. And these continue to improve in coverage which reduce unsought communication.

Even so, it is often difficult to prioritize the reading and response to received email that is all legitimate. Some of the mail sent as CC to CYA may require intervention or stimulate action on the part of the recipient, while most of it is merely documentary or informational.

For the purpose of clarifying the invention within the disclosure we define certain terms: Disposition of electronic communication is defined to include archiving a message, reading and forwarding an email to another recipient, reading and replying to the sender of an email, engaging with the message, and deleting a message. Messages include other than email such as voice messages, faxes, multimedia messages, tweets, and feeds. A sound bite is a short clip of speech or music extracted from a longer piece of audio, often used to promote or exemplify the full length piece. In the context of journalism, a sound bite is characterized by a short phrase or sentence that captures the essence of what the speaker was trying to say, and is used to summarize information and entice the reader or viewer. Herein a précis (pronounced "preh-si"): is a transformation of a summary or abridgment but is a representation rather than a truncation. Herein a viewport is a virtual window presented on a display which bounds all or a portion of an array of message précis. Navigation controls cause the viewport to pan or scroll the visible portion of the array.

It is known that OAuth is an evolving framework and open standard for authorization. OAuth provides a method for clients to access server resources on behalf of a resource owner (such as a different client or an end-user). It also provides a process for an end-user to authorize third-party access to his server resource without sharing his credentials (typically, a username and password pair), using user-agent redirections.

IETF RFC 6749 discloses: an OAuth 2.0 authorization framework enables a third-party application to obtain limited access to an HTTP service, either on behalf of a resource owner by orchestrating an approval interaction between the resource owner and the HTTP service, or by allowing the third-party application to obtain access on its own behalf. This IETF specification replaces and obsoletes the OAuth 1.0 protocol described in RFC 5849.

OAuth provides an authorization layer to separate the role of the client from that of the resource owner. In OAuth, the client requests access to resources controlled by the resource owner and hosted by the resource server, and is issued a different set of credentials than those of the resource owner.

Instead of using the resource owner's credentials to access protected resources, the client obtains an access token—a string denoting a specific scope, lifetime, and other access attributes. Access tokens are issued to third-party clients by an authorization server with the approval of the resource owner. The client uses the access token to access the protected resources hosted by the resource server.

A growing number of hours per day for each email user is being lost to read and dispose of automated email messages from legitimate commercial and social relationships. Each person has their own preferences on how to handle various types of messages.

What is needed is a quicker and personalized way for a message recipient to react to and dispose of the majority of a large volume of messages which match substantially similar previously received and resolved messages.

BRIEF SUMMARY OF THE INVENTION

An apparatus provides an optional instrumented viewport to message recipients to record message operations such as archive, open, play, add to calendar, reply, or delete, in general, dispositions, and the elapsed time-to-disposition (TTD) from when the message usefully entered the instrumented viewport.

For messages that have similarities, e.g. from same sender, from similar IP addresses, similar subject text strings, or message body formats, the instrumented viewport also displays a proposed operation (disposition) and a proposed TTD, both of which may be overridden within the instrumented viewport.

A timer is launched when a message occupies the viewport long enough to be apprehended. Upon expiration of the timer, a disposer circuit performs the proposed operation on the message.

The proposed TTD and proposed disposition is derived from analyzing the history of similar messages such as recipient's most recent dispositions of messages from the same sender. Alternately, the history of sender's frequency, recency, and quantity of messages will influence a proposed TTD and disposition. Alternately, a quality of content scored by metrics of keywords determines a proposed disposition and TTD.

The invention reduces a user's effort in scanning messages. Action or inaction can be proposed as defaults from analyzing the characteristics of the message. From prior user mail handling behaviors, a circuit predicts a most likely recipient action on a message. A predicted/proposed action is displayed in the viewport along with an excerpt or representation of the message.

Continuous machine learning reduces the error rate in prediction and increases the percent of time the user views an incoming message and accepts the proposed action. A circuit receives and analyzes mail, text, voice, faxes in a method which reflects the recipient's past preferences and behaviors. The apparatus applies methods for machine learning and benefits from data patterns in individual history. A message apparatus proposes a most likely action for each message according to rules derived from a message recipient's own prior preferences. Messages are analyzed using rules and learned preferences. A recipient accepts or corrects the proposed action. When a recipient determines a different action than anticipated, the disposition is stored for future reference.

BRIEF DESCRIPTION OF THE SEVERAL VIEWS OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

Figure 1:
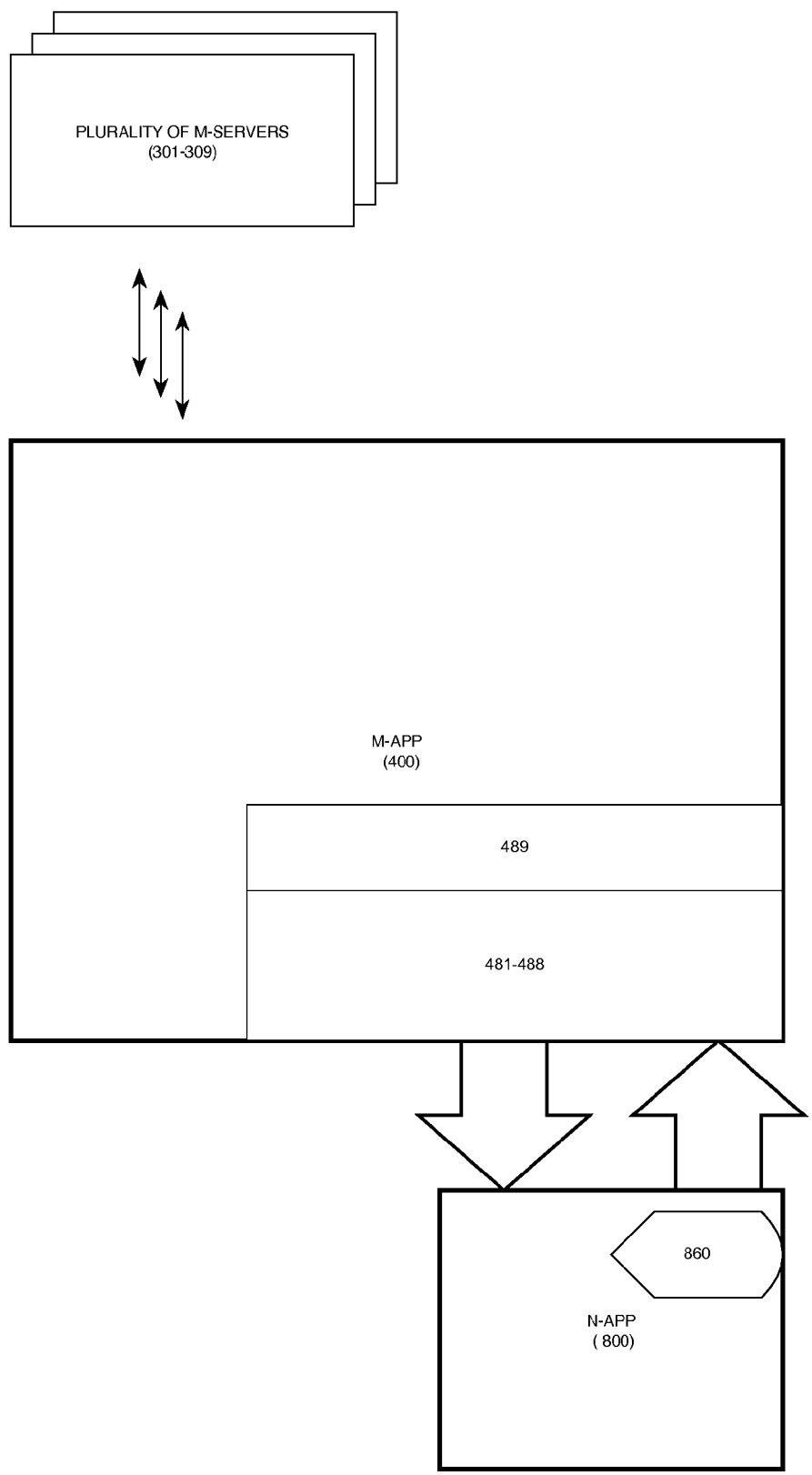
FIG. 1-3 are block diagrams of a system and its components.

One aspect of the proposed message disposition invention is a system that includes a navigator that has an instrumented viewport to display a proposed time-to-disposal (TTD) and a proposed disposition for each message; and, a transformer that has a timer for each message in the viewport which causes a disposer circuit to perform the proposed disposition when the time-to-disposal elapses after the message enters the viewport, the transformer is coupled to the navigator and also coupled to at least one of a plurality of message servers.

In an embodiment, the transformer also includes an interface circuit to retrieve a message body and headers from a message server; a disposition store of recipient's previous message dispositions and time-to-disposal (TTD); a predictor circuit to propose a most likely disposition and most likely TTD by closest match of a retrieved message with a similar message in disposition store using content, sender id, ip address, or domain; and, a précis synthesizer circuit to transform message body and headers and proposed TTD and disposition into a message précis.

In an embodiment, the navigator also includes a user interface to receive commands to perform message dispositions including, but not limited to, archive, delete, forward, open, play, reply-to, and schedule that are recorded into disposition store and transmitted to the message server; a user interface to receive commands to amend a proposed disposition and to amend a proposed TTD; sensors to determine a time when a message entered or exited the viewport, and a time when a message was disposed; and, a navigation control to scroll or pan message précis through the viewport.

In an embodiment, the transformer also includes a disposition recorder to write TTD and disposition into disposition store; and an interface circuit to transmit a command to the message server to implement the disposition.

A user operates the message navigation control to display message précises, to select message précis, and to issue commands to operate on message précis. A message précis is easily distinguished from conventional message metadata by inclusion of a proposed disposition, and a proposed time to disposal (TTD). According to the message type, its précis also may have a soundbite of a voice or audio file, a thumbnail of an image, or an excerpt of a text message.

In an embodiment, the navigator provides an instrumented viewport and navigation control and reports to the transformer when the message précis enters the viewport, when the user opens a message, and when the user deletes a message. In an embodiment, the navigator provides timers for each proposed message disposition and signals the transformer when to perform a message disposition either from user activity or from timer completion.

In an embodiment, the transformer also has a command circuit to delete the message from the message server at the earlier of the expiration date and the user causing the message to be deleted.

In an embodiment the system also has a circuit that upon receiving the message metadata, determines a proposed TTD and a proposed disposition when recipient has recently disposed a similar message. In an embodiment, the system tracks frequency, recency, and quantity of messages received from a sender to determine a proposed TDD and a proposed disposition. In an embodiment, the system scores content of the messages to determine a quality of messages between a sender and a recipient.

In an embodiment, the navigator also has a circuit to display a selectable message précis, a proposed TTD, and a proposed disposition in an instrumented viewport that senses when each message enters the viewport, when the message is opened, and when the message is deleted.

In an embodiment, the transformer also has a timer that is triggered by the instrumented viewport and that causes performance of the proposed disposition when the proposed TTD matures absent intervention by the user.

In an embodiment, a précis includes a soundbite or a thumbnail reduced size lower resolution image from a video.

In an embodiment, a précis includes an image of a text string excerpted from a message body.

Message précis are stored into an N-dimensional array of categories and ranks. User controls determine if these message précises are presented in a 1 dimensional list, a 2 dimensional table, or some other visualization.

A message précis navigation interface scrolls and or pans message précis into or out of a viewport. The viewport displays metadata for each message including the sender, date, subject, a proposed disposition, and some representation of the message. When a précis has been present within the viewport more than a threshold of time, a timer is started. The recipient may stop or reset the time to a shorter or longer period. Unless the recipient operates on the message précis, the proposed disposition is performed upon completion of the timer.

The message transformation and disposition apparatus (transformer) comprises an interface circuit to access at least one message server. The transformer includes a commands transmitter that sends commands to a message server such as but not limited to archive, retrieve, delete, open, play, forward, reply-to, and combinations thereof. The transformer includes a plurality of timer circuits for each message précis and a timer control circuit that receives commands from the recipient display and control apparatus to start, stop, and reset any timer. A message disposition circuit implements a disposition command received from a recipient display and control apparatus or upon timer expiration performs a proposed disposition. A message disposition store records a plurality of disposition actions and times for each sender. For each received message, a disposition predictor circuit reads the most recent dispositions and times if a sender has a stored record in the disposition store and proposes a disposition and a time to execute the proposed disposition.

A categorization circuit groups messages by type, or by sender organization, or by subject matter or by message type. In an example, messages from family are grouped, messages relating to work are grouped, messages relating to finances are grouped, messages relating to hobbies or interests are grouped.

A ranking circuit sets a priority for messages within each group. Messages with a proposed disposition of deletion are of lowest priority. Messages with long time-to-disposal have lower priority than messages with shorter time-to-disposal. Messages whose proposed disposition is to forward or reply have higher priority than messages whose proposed disposition is to archive.

The message transformation and disposition apparatus transforms a plurality of messages into précis which have proposed TTD and proposed dispositions, groups, and ranks. The apparatus transforms minimal activity of the recipient into operations at the message server.

The recipient display and control apparatus has a viewport through which précis may be presented to the user. A navigator circuit determines which précis are displayed. A timer signaling circuit transmits a scoping event when a message précis has been within the viewport for a time greater than a threshold, when the message is selected or when the message is disposed. In an embodiment, the granularity of a timer may not even record that a message has been within a viewport until a substantial time has passed. A message status circuit removes message précis from the store when deleted and signals the message transformation and disposition apparatus to transmit commands to the message server. A message control circuit causes messages to be fully displayed when selected, receives and performs deletion commands, receives and executes timer reset commands, and configures the viewport to appear as a list, a table, or an other form of display. A determination that a message has been attended to within a viewport may be obtained by a video camera facing the user.

The recipient display and control apparatus transforms a collection of message précis into a selectable list or table. The apparatus transforms minimum activity on the part of the user into disposition commands and stores the dispositions for future replication.

Another aspect of the invention is a system for message disposition acceleration by a recipient that includes: a message navigation and viewport control apparatus (navigator) that has an instrumented viewport to record disposition of messages and time from whence each message first entered the viewport until each message is disposed; and, a message transformation and disposition apparatus (disposer) that has a store of recipient's message dispositions and each time-to-disposition (TTD) for messages received by recipient and a store of message dispositions and TTD performed by one or more of recipient's message senders.

In an embodiment, a circuit, such as a processor coupled to a non-transitory instruction store, determines a condition of read or viewed for an electronic document (email) in an email client when the email gets scrolled past a specialized viewport screen.

In an embodiment, if the operator opens the email, the signaler circuit can time how long the email is versus how long the operator has been looking at it to estimate read percentage In an embodiment, a message disposition is opening a related application wherein a related application is one of the following a web browser, a phone app, a text message app, a contacts manager, a reading app, a shopping app, and a calendar app.

In other embodiments, a signaler circuit measures how long the operator left a message in his inbox, if he replied and how long he waited to reply, if he deleted it, if he opened it, if he moved it and to where, or if he ignored it. The invention then uses all of these metrics to build intelligence on how important that email is to its recipient.

From a recipient's recorded prior message handling behaviors, a circuit predicts a most likely action on another message to a user. An instrumented viewport displays a predicted/proposed action along with an excerpt of the message. When the user chooses an action different from the predicted action in response to the message, the circuit develops a pattern to better match the characteristics of the message in future predictions.

The present invention provides productivity for receiving and responding to electronic messages such as e-mail but may also apply to images, video, audio, and other sensory communications. The apparatus improves rules to apply to future received messages after observing the recipient's corrected treatment or action.

In effect the apparatus forecasts what a user will likely do in response to a message with certain characteristics. In many cases, the user will simply digest a notification, e.g. that an event succeeded as expected and subsequently archive or discard the message e.g. out of office replies, shipments shipped, payments paid, FYI informational, acknowledgements/receipts with no action required. The app shows a proposed relocation or disposition and after the recipient has had an opportunity to scan a message précis, performs the proposed action.

In a graphical visualization, a plurality of thumbnails or icons of emails is presented to a user who may move, gesture, or click on an email to correct, confirm, or accelerate the proposed action.

The message apparatus records to whom the recipient has either responded in the past or from whom the recipient has requested action in the past. The frequency, recency, and quantity of message traffic from a sender to a recipient is noted for future use. A quality of message traffic is determined by scoring content using a keyword filter. Natural language processing of these metrics provides an intent score. Communications from those people have different proposed actions if they seem to be conversational (as opposed to broadcast/informative). Messages or communications with dates have a level of urgency and may be proposed to be added to a calendar.

One aspect of the invention is a method executable by a processor to perform steps for continuously improving a user's productivity in disposing of electronic messages: accessing a message recipient's inbox at a message server; copying and storing an unread message; determining from characteristics of the message, a proposed action, and a proposed time to perform the proposed action after the user has first put the message in scope; displaying in a viewport an excerpt or representation of the message, a proposed action and a proposed time when the proposed action will be scheduled after the message is first in scope; observing when the user first places the message in scope in the viewport and starting a timer; performing the proposed action when the timer completes unless the user intervenes by performing another action or adjusting the timer; receiving a user command to reset the timer: observing the user's preferred response to the message; and improving the rule base with additional message characteristics, proposed actions, and timers.

In an embodiment, the characteristic is that the message contains the words "to unsubscribe". In an embodiment, the characteristic is that the message has a plurality of addressees. In an embodiment, the characteristic is that the message is a reply to the recipient's previously transmitted message or is in a thread of related messages.

In an embodiment, the proposed action is to initiate a chat, voice, or video connection. In an embodiment, the proposed action is to transfer the contents of the message to a calendar. In an embodiment, the proposed action is to move the message to a folder. In an embodiment, the proposed action is to archive the message. In an embodiment, the proposed action is to send an acknowledgement message. In an embodiment, the proposed action is to open a reply window.

In an embodiment, a timer is set for H hours from accessing the inbox. In an embodiment, a timer is set for M minutes from first scan of message excerpt. In an embodiment, a timer is set for D days from date of last opening of message.

In an embodiment, scope is determined by a viewport circuit which flags emails considered viewed when scrolled past the screen because email does not need to be opened as an excerpt or representation is normally enough to get the essence.

In an embodiment, the determination is also time/speed sensitive. In an embodiment, on the condition that an operator of an email client rapidly scrolls to the bottom of his inbox it might not count as read. But, on the condition that the operator scrolls slowly i.e. below a threshold, the messages are considered read.

In addition the invention detects when the operator has been in his inbox using another app. If the signaler circuit checks an inbox at time A and one of the following conditions is observed at time B, it determines the operator has been in the inbox: are there any new emails which have the read flag set; have any emails that used to be there been deleted; have any emails switched from read to unread or unread to read; have any emails been replied to; or have any emails been flagged or unflagged.

Referring now to the figures, FIG. 1 shows a system 100 that includes a navigator apparatus 800 that has an instrumented viewport circuit 860 to display a proposed time-to-disposal (TTD) and a proposed disposition for each message; and, a transformer apparatus 400 that has a timer circuit 481-488 for each message in the viewport which causes a disposer circuit 489 to perform the proposed disposition when the time-to-disposal elapses after the message enters the viewport, the transformer coupled to the navigator and also coupled to at least one of a plurality of message servers 301-309.

Applicant's Message Transformation & Disposition Apparatus 400 (transformer) is coupled to Applicant's Précis Navigation and Viewport Control Apparatus 800 (navigator). The Transformer is also communicatively coupled to at least one of a plurality of message servers 301-309 using an interface circuit such as the OAuth framework or a plug-in.

Figure 2:
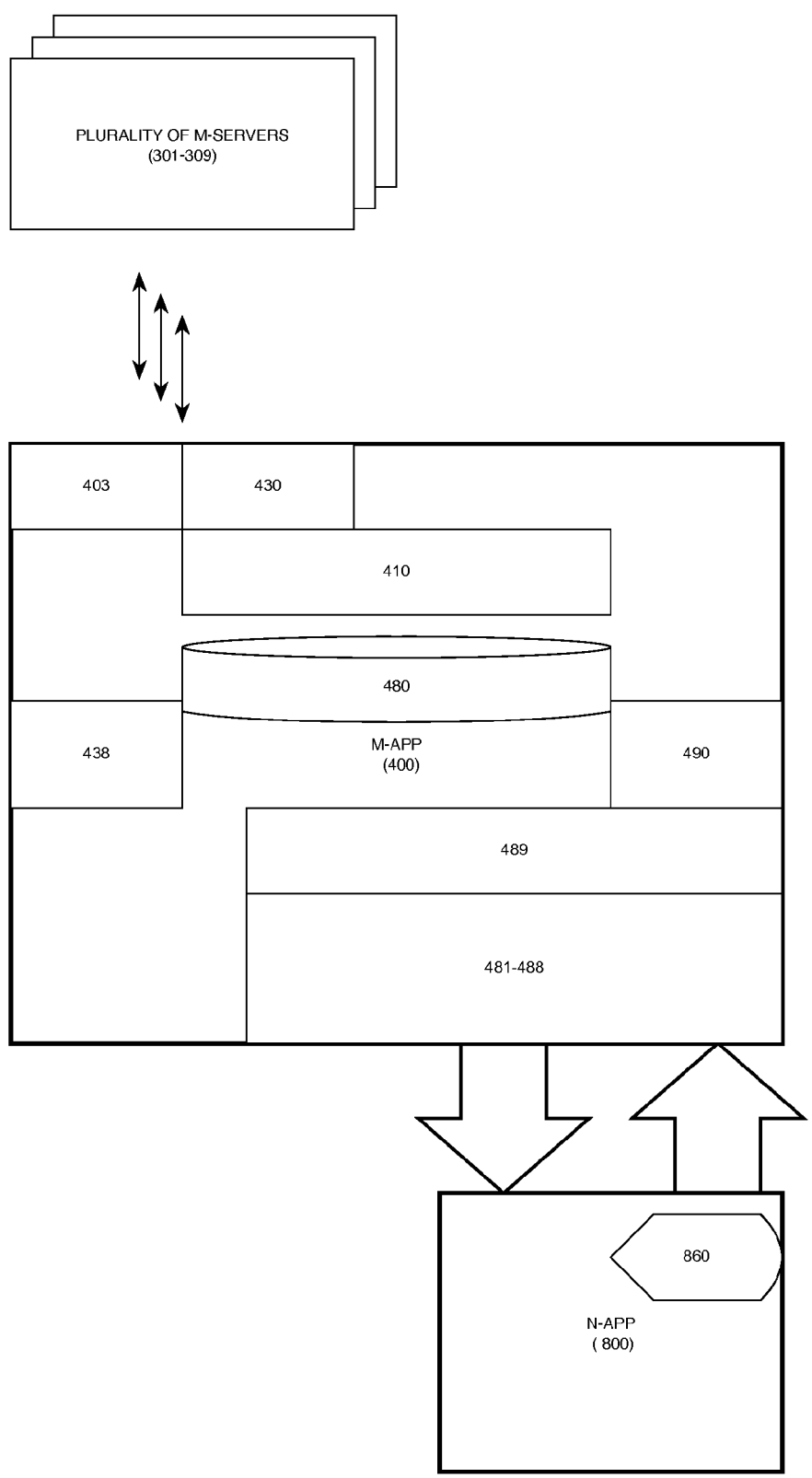

FIG. 2 shows an apparatus block diagram of transformer components. In an embodiment, the transformer 400 also includes an interface circuit 430 to retrieve a message body and headers from a message server; a disposition store 480 of recipient's previous message dispositions and each time-to-disposal (TTD); a predictor circuit 438 to propose a most likely disposition and most likely TTD by closest match of a retrieved message with a similar message in disposition store using content, sender id, ip address, or domain; and, a précis synthesizer circuit 410 to transform message body and headers and proposed TTD and disposition into a message précis.

In an embodiment, the transformer 400 also includes a disposition recorder 490 to write TTD and disposition into disposition store 480; and an interface circuit 403 to transmit a command to the message server to implement the disposition.

Figure 3:
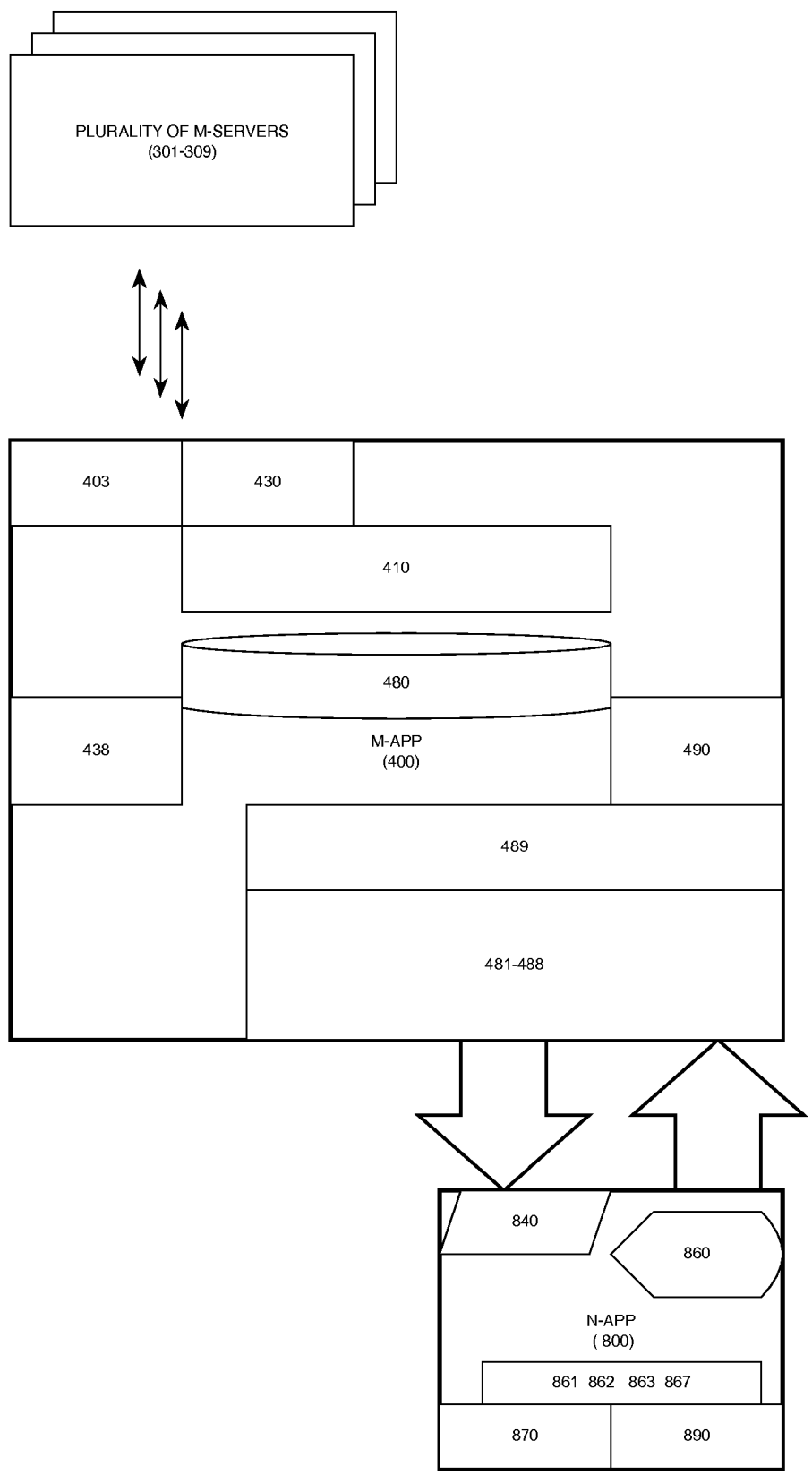

FIG. 3 shows an apparatus block diagram of navigator components. In an embodiment, the navigator 800 also includes a user interface 870 to receive commands to perform message dispositions including, but not limited to, archive, delete, forward, open, play, reply-to, and schedule that are recorded into disposition store and transmitted to the message server; and a circuit 890 to receive commands to amend a proposed disposition and to amend a proposed TTD; sensors 861-863 to determine a time when a message entered or exited the viewport, and a time when a message was disposed; a sensor to receive user's message disposition commands 867; and, a navigation control 840 to scroll or pan message précis through the viewport. In an embodiment, timers 481-488 are located within the navigator instead of the transformer (not shown).

Figure 4:
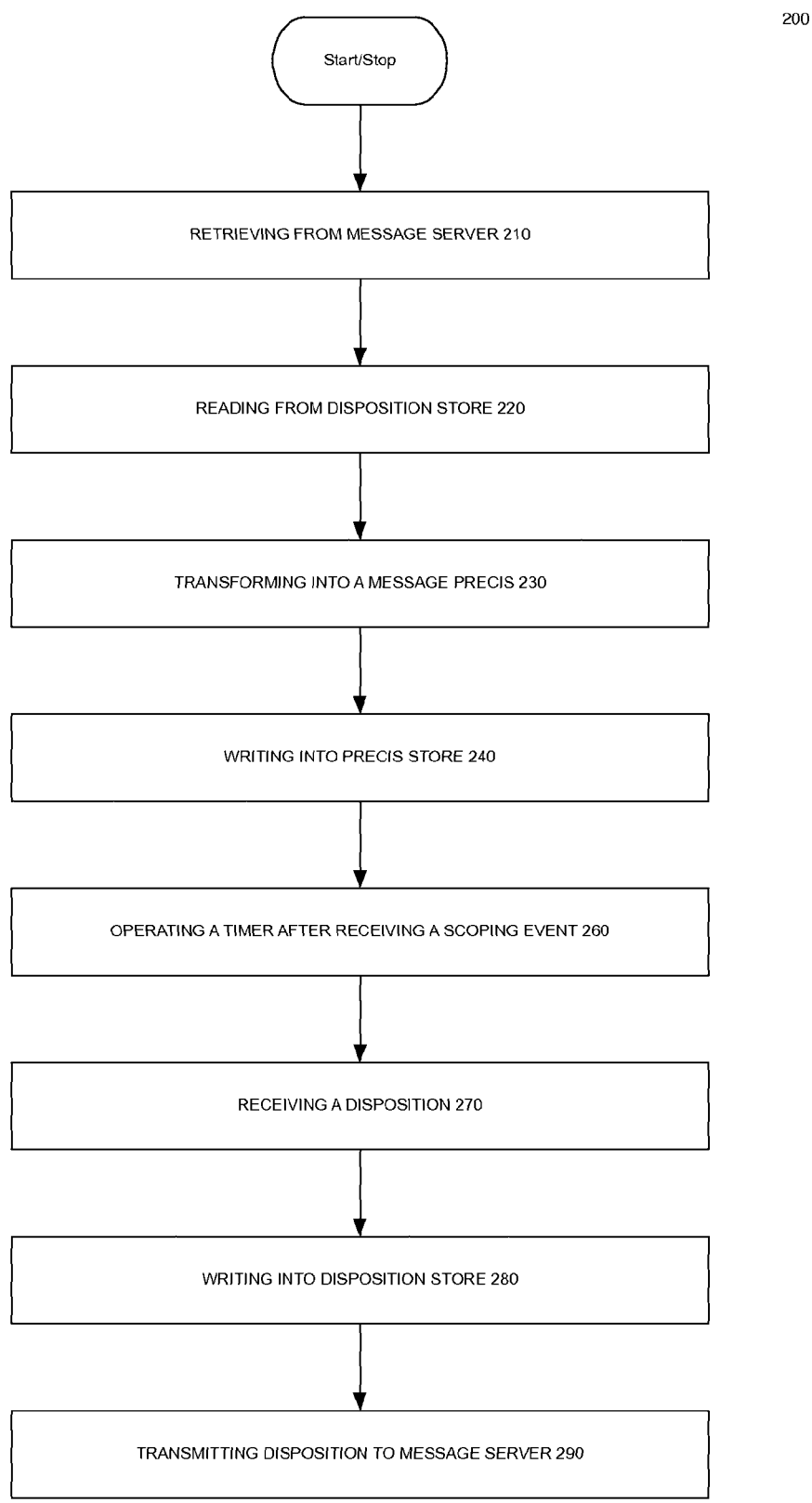
FIG. 4-5 are flowcharts of processes in each method of operation of the components of two apparatuses of the system.

Referring now to FIG. 4, Applicant discloses an exemplary embodiment of a process flowchart of performing method for operating a M-APP transformer apparatus, the method 200 comprising several processes:

Process 210 has steps for retrieving from message server, a message body and headers. In an embodiment, this also includes at least one of the following steps: identifying messages recently transmitted to sender id of the retrieved message; identifying messages recently transmitted on same subject of the retrieved message.

Process 220 has steps for reading from disposition store. This includes at least one of the following steps: identifying disposed messages with similar sender id, ip address, subject, meta data, message body content, or other characteristics; and, reading a stored time-to-disposal (TTD) and a disposition for the disposed messages similar to the retrieved message.

Process 230 has steps for transforming the stored disposition history and the received message body and headers into a message précis. This includes at least one of the following steps: transforming a message body into a soundbite, transforming a message body into a low resolution, reduced size image, transforming a message body into an image of a text fragment, determining closest match of retrieved message with similar message in disposition store, determining most likely TTD from closest message in disposition store, determining most likely disposition from closest message in disposition store, and synthesizing a message précis from TTD, disposition, message headers, and one of image and soundbite of message body.

Process 240 has steps for writing into an n-dimensional précis store. This includes at least one of the following steps: grouping messages with similar subjects, senders, or content types; ranking or prioritizing messages by TTD, calendar dates, actions requested, proposed disposition, size, how recently recipient transmitted a message to sender, storing message group, storing message rank/priority, storing message précis, storing proposed TTD and proposed disposition, and signaling the navigator when the writing is completed.

Process 260, which is optional but disclosed for completeness, has steps for operating a timer upon receiving a Scoping Event. This includes at least one of the following steps: receiving a signal that a message précis has entered a viewport for a non-trivial period, receiving a signal that a user has overridden a proposed TTD, receiving a signal that a user has overridden a proposed disposition, and receiving a signal that a user has selected a disposition action.

The process triggers operating a timer circuit after scoping by initializing a timer to a TTD, resetting a timer when user changes proposed TTD or proposed disposition, suspending/restarting upon a user intervention, and, triggering a proposed disposition when a timer expires.

Process 270 has steps for receiving a disposition. This includes at least one of the following steps: receiving a disposition command from the user, receiving a disposition command from a timer upon timer expiration, and causing a disposition circuit to perform the disposition.

Process 280 has steps for writing into disposition store. This includes at least one of the steps following: updating disposition store with actual TTD and actual disposition, removing disposed message from précis store, retraining disposition store for future predictions on similar messages, storing into disposition store date of disposition, sender id, ip-address, domain, subject, links in message body, message metadata, grouping, and message type; whereby the system is trained on recipient's preferences and policies to be applied to future retrieved messages.

Process 290 has steps for transmitting to a message server at least one command to perform a disposition. This includes but is not limited to at least one of: transmitting a command to archive a message, transmitting a command to forward a message, transmitting a command to reply-to a message, transmitting a command to delete a message, transmitting a command to another application to open a message, transmitting a command to another application to play a message, and, transmitting a command to another application to block a sender.

The process for operating the timers could be embodied remotely in each navigator or centralized into the transformer or could operated in both. Applicant describes both embodiments which can be optimized by implementation considerations.

Figure 5:
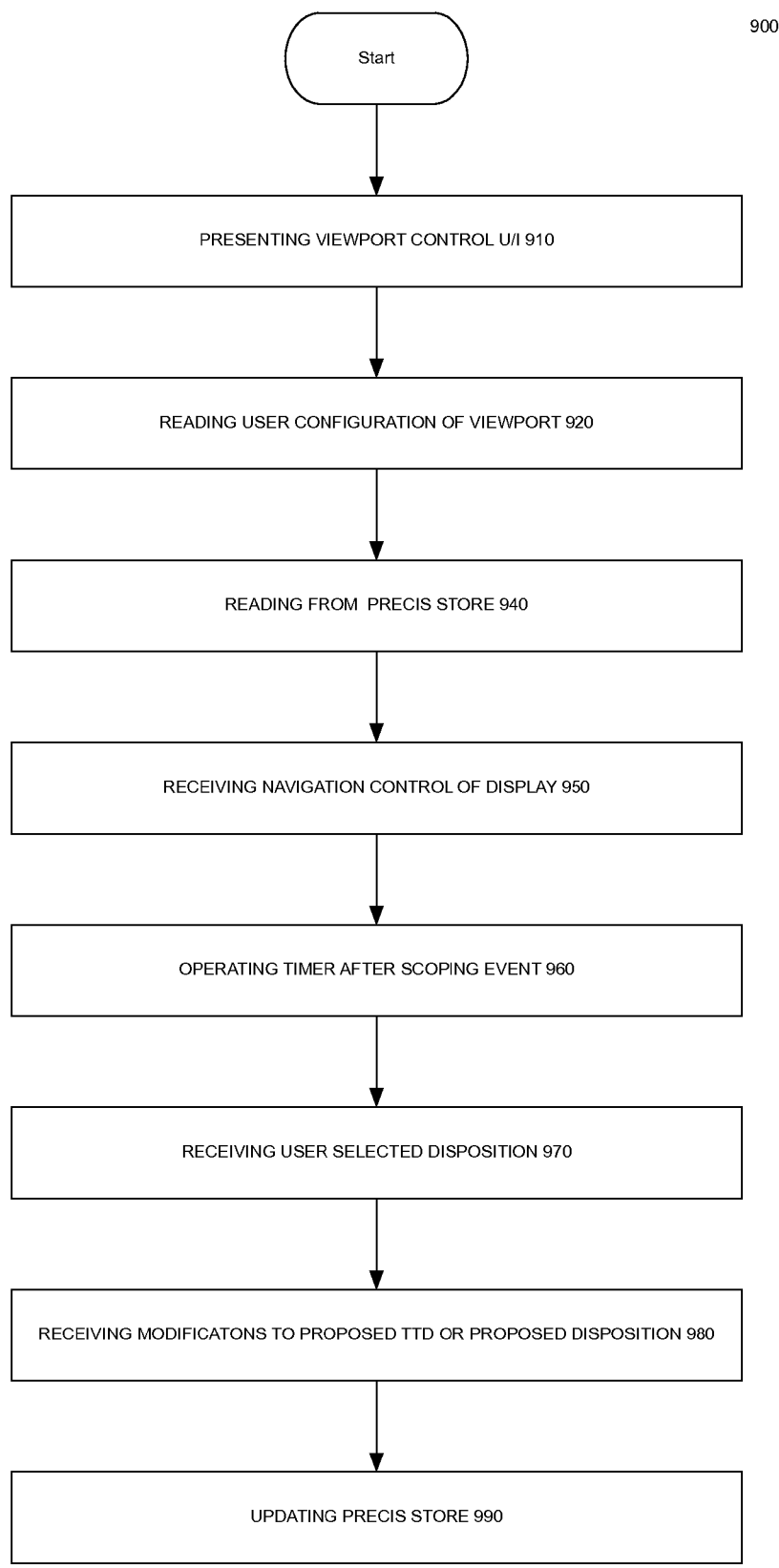

Referring now to FIG. 5, Applicant discloses an exemplary but non-limiting flowchart of precesses performing a method for operating an N-APP navigator apparatus, the method 900 including the following processes:

Process 910 has steps for presenting a viewport control user interface. This includes displaying data entry widgets with defaults, receiving user inputs, and storing parameters.

Process 920 has steps for reading and implementing user configuration of a viewport. This includes configuring the viewport to appear as a list, a table, or another form of display. This includes setting a threshold for the minimum time a message must be within the viewport to be considered "entered" so that a fleeting glimpse as a user moves the viewport is not counted. An attention timer of the viewport may determine when a user has had enough attendance on a message to initiate a disposition timer. In an embodiment a 3D video camera of the apparatus determines that a user has had his head or his eyes arranged in a perceptive orientation.

Process 940 has steps for reading from précis store. This includes at least one of the following steps: receiving notification from a transformer that new message précis have been stored, reading message précises stored since the last time the message précis store was accessed, reading groups, ratings, proposed TTD, proposed disposition, and message headers and a representation of a message body, organizing the précises into a table, a list, or another format according to user configuration.

Process 950 has steps for receiving navigation commands which control the display of selectable précis in as instrumented viewport. This includes at least one of the following steps: receiving user commands to move précis into and out of scope because not all précis may be visible at once, displaying selectable précis in a viewport according to scrolling and panning controls received from a user, displaying précis in groups of similar messages if user has configured the viewport so, displaying précis in ranked order if user has indicated a preference.

A message précis navigation interface scrolls and or pans message précis into or out of an instrumented viewport. The instrumented viewport displays metadata for each message including the sender, date, subject, an editable proposed disposition, an editable proposed expiration time, and other information in graphic form. The method includes causing selected messages to be fully displayed upon command.

Process 960, portions of which are optional but disclosed for completeness, provides steps for operating a timer after determining a scoping event. This includes at least one of the following steps: receiving a signal that a message précis has entered a viewport for a non-trivial period, i.e. more than a threshold of time, receiving a signal that a user has overridden a proposed TTD, receiving a signal that a user has overridden a proposed disposition, receiving a signal that a user has selected a disposition action.

In an embodiment the navigator also comprises at least one timer. Upon determining that a message précis has entered a viewport (scoping), the process signals a timer either in the navigator itself or in the transformer.

The steps for operating a timer circuit after scoping includes: initializing a timer to a TTD, resetting a timer when user changes proposed TTD or proposed disposition, suspending/restarting upon a user intervention, and triggering a proposed disposition when a timer expires.

The navigator has an instrumented viewport which performs: sensing when a message précis enters the viewport; sensing when a message précis leaves the viewport, determining that a message and its proposed action, response, or trigger (ART) have entered scope when the user has had sufficient visibility in the viewport to observe the excerpt and proposed actions, initiating a time/day trigger circuit to begin a count down to launching the proposed action or response optionally at the navigator or at the transformer. A trigger may signal to an external process or cause a counter to increment or decrement with no immediate effect, or set a flag.

Process 970 has steps for receiving a user disposition. A user interface enables selection of one or more messages and then application of a disposition, proposed disposition, and proposed TTD to all selected messages or alternately, selection of a disposition, proposed disposition, and proposed TTD followed by flagging each message which is to be operated on. The steps include at least one of the following: sensing when a user disposes of a message, receiving deletion commands, signaling the transformer to transmit commands to the message server, storing a stack of commands for undo, receiving a disposition when a timer expires, and transmitting dispositions and changes to the transformer.

Process 980 has steps for user modifications to proposed TTD or proposed disposition. This includes at least one of the following steps: receiving a user override of a proposed TTD or a proposed disposition, receiving and executing timer reset commands, and transmitting to the transformer the updated TTD and proposed disposition.

Process 990 has steps for updating the précis store. This includes at least one of the following: writing into précis store a new proposed TTD, and new proposed disposition upon user intervention, and removing message précis from the store when deleted either actively by the user or passively when the timer expires, redisplaying the viewport with updated message précis.

Another aspect of the invention is a computer implemented method for automated custom transformation of and response to received electronic messages comprising: presentation of proposed actions, responses, and triggers (ART) for a message; observation of user intervention or acceptance of proposed ART; and machine learning from user intervention of more tightly tuned ART for message profile.

In an embodiment, the invention is a method which presents proposed actions, responses, and triggers (ART) for a message. It includes retrieving an electronic message from an inbox; determining a message profile according to characteristics of the message such as the sender name, personal and business address book, external links embedded in the message, content of the message, reviewing the user's personal history of mail sent or received, selecting from stored proposed actions, responses, and triggers the most likely choice for this message profile by applying heuristics, and displaying in a user viewport an excerpt of the message and the proposed ART.

In another embodiment, the invention is a method for observation of user intervention or acceptance of proposed ART performed by a processor: suspending and restarting the time/day trigger circuit when a user intervenes to reset the time/day, suspending the time/day trigger circuit when a user intervenes to perform an action different from the proposed action or response, and performing the proposed action or response when inaction by the user allows the time/day trigger circuit to launch.

In another embodiment, the method includes machine learning of more tightly tuned ART for message profile from user intervention in a viewport: for each presented message that a user does not accept a proposed ART, storing a new time/day trigger which might be a local time of day, day of week, or elapsed time from the message first entering scope, storing a new action, response, or disposition for a message to be launched upon fulfillment of the trigger, and associating at least one of the new trigger and ART with the profile of the message.

Another method for operation of a transformer includes the processes: generating a message précis by reading recipient's disposition store, retrieving message headers and metadata from a message server, and transforming a message body into a message précis. For each message, a disposition proposer circuit reads the most recent dispositions and times if a sender has a stored record in the disposition store and proposes a disposition and a time to execute the proposed disposition. A message précis is easily distinguished from conventional message metadata by inclusion of a proposed disposition, and a decay/expiration time. According to the message type, its précis also may have a soundbite of a voice or audio file, a thumbnail of an image, or an excerpt of a text message, or a logo/shape associated with a benefit. The method also includes storing the message précis into an N-dimensional array of categories and ranks. User controls will determine if these message précises are presented in a 1 dimensional list, a 2 dimensional table, or some other visualization. The method includes receiving navigation controls and delivering message précis to the navigator in the requested visualization. When a précis has been present within the viewport more than a threshold of time, a timer is started, either in the navigator or in the transformer or both. The process includes receiving user commands to stop or reset the time to a shorter or longer period. Unless the recipient operates on the message précis, the process includes performing proposed disposition upon completion of the timer.

A message disposition process includes storing one or more disposition actions and times for each sender and transmitting an equivalent command to a message server.

A method for operating a categorization circuit includes grouping messages by type, or by sender organization, or by subject matter or by message type. In an example, messages from family are grouped, messages relating to work are grouped, messages relating to finances are grouped, messages relating to hobbies or interests are grouped.

A method for operating a ranking circuit includes setting a priority for messages within each group. Messages with a proposed disposition of deletion are of lowest priority. Messages with long time to live have lower priority than messages with shorter time to live. Messages whose proposed disposition is to forward or reply have higher priority than messages whose proposed disposition is to archive.

The message transformation and disposition apparatus transforms a plurality of messages into précis that have TTD and proposed dispositions, groups, and ranks. The apparatus transforms minimal activity of the recipient into operations at the message server.

A recipient display and control apparatus transforms a collection of message précis into a selectable list or table. The apparatus transforms minimum activity on the part of the user into disposition commands and stores the dispositions for future replication.

In an embodiment, the transformer apparatus includes an interface to at least one message server, an interface to at least one navigator, a store of message dispositions and each time to disposition (TTD), a message transformer that generates précises, at least one timer for each message that enters an instrumented viewport, and a disposer that performs the proposed disposition when a timer expires.

In an embodiment, the message transformation and disposition apparatus (transformer) comprises an OAUTH interface circuit to access at least one message server. The transformer includes a command transmitter that sends to a message server such as but not limited to archive, retrieve, delete, forward, and reply. The transformer includes a plurality of timer circuits for each message précis and a timer control circuit that receives commands from the recipient display and control apparatus to start, stop, and reset any timer. A message disposition circuit implements a disposition command received from the recipient display and control apparatus or upon timer expiration a proposed disposition.

In an embodiment, the navigator apparatus includes a timer, an interface circuit to the transformer, an instrumented viewport, a viewport navigation control circuit, a message entry sensor, a message exit sensor, a user command sensor, a message disposition sensor, a circuit to read stored message dispositions and TTD, and a circuit to display a proposed disposition and TTD for each message within the viewport. A navigator circuit determines which précis are displayed. A timer signaling circuit transmits events to the message transformation and disposition apparatus when a message précis is within the viewport for a time greater than a threshold, when the message is selected or when the message is disposed. A message status circuit removes message précis from the store when deleted and signals the message transformation and disposition apparatus to transmit commands to the message server. A message control circuit causes messages to be fully displayed when selected, receives and performs deletion commands, receives and executes timer reset commands, and configures the viewport to appear as a list, a table, or an other form of display.

Another aspect of the invention provides an overlay triage service (which is accessible by wide area networking i.e. the cloud) that accesses a user's inbox at a mail server. The service transforms an email message by applying heuristic rules stored in non-transitory media to determine a potential treatment selected from a non-transitory media, customized to match the end user's history. An enduser viewport application (app) displays the transformed email message which contains a proposed treatment and a timer. The app determines when the enduser first places the transformed message in scope and starts the timer. If the enduser resets the timer, or performs a response to the message different from the proposed treatment, that new behavior is added to the enduser history. If the timer expires without enduser intervention, the proposed action is performed.

In an embodiment, an email client is coupled to a triage plugin which accesses the cloud overlay triage service to display the same proposed actions.

Another aspect of the invention is an adaptive user interface apparatus for accelerated message disposition, the apparatus comprising: an attendance and disposition recordation circuit (recorder); the recorder communicatively coupled to, a disposition timer circuit (timer), the timer communicatively coupled to, a scoping and selection determination circuit (scoper); the scoper, timer, and recorder all communicatively coupled to a navigation, selection, and disposition apparatus (navigator), wherein said navigator comprises a viewport, user controls to place a sub-range of an array of enhanced message metadata (enhanced précis) within the viewport, and sensors to determine when a particular enhanced précis is substantially within the viewport and when the user operates a selection mechanism on the particular enhanced précis; whereby, a proposed disposition within the enhanced précis is executed on a message by the recorder, after the timer determines a condition that a proposed disposition delay time within the enhanced précis has elapsed since the time the particular enhanced précis was first within the viewport, without a user operated selection.

In an embodiment, the apparatus also has an enhanced précis grouping and ranking circuit (grouper) to present a plurality of enhanced précis to the navigator as an n-dimensional array; the grouper coupled to the navigator by, a transceiver circuit (transceiver), the transceiver further coupled to the message attendance and disposition recordation circuit, whereby an enhanced précis which has been disposed is removed from the array, and a message in a message system is operated on when its respective enhanced précis is removed; and wherein, the grouper transforms a plurality of enhanced précis into an array of groups by similarities in the messages and transforms each group by ranks according to a proposed disposition delay time and a proposed disposition to be executed after expiration of the proposed disposition delay time by the timer.

In an embodiment the apparatus also has a past précis disposition profile circuit (profiler), the profiler communicatively coupled to the recorder, and to the grouper; the profiler including a proposed disposition updater circuit to receive, weight, and combine most recent dispositions for similar précis, a proposed disposition delay time updater circuit to receive weight, and combine most recent reaction times for similar précis, and a circuit to transform a précis into an enhanced précis by adding a proposed disposition and a proposed disposition delay time; whereby a user's most recent selections or dispositions of messages in the navigator influence a proposed disposition and proposed disposition delay time of a future similar message.

CONCLUSION

Thus it can be appreciated that the invention is distinguished by two major components. A message transformation and disposition apparatus (transformer) retrieves message metadata and body content from a message server to generate a message précis. A message précis is a transformation of metadata and the body content.

The second major component is a précis navigation and viewport control apparatus (navigator) that displays a selectable message précis and that enables message deletion, message moving, message forwarding, message flagging, and message opening. The navigator is most likely to be distributed and local to each user and measures the user's activity or inactivity, choices, and displays. The transformer might be remote and centralized or also local to the user.

At minimum the navigator provides an instrumented viewport and navigation control to sense when the message précis substantially enters the viewport, when the user opens a message, and when the user deletes a message. These operations trigger timers and operations at the message server or transformer. A fleeting glimpse of the précis while the viewport scrolls to the bottom does not trigger. The précis has to be within the viewport above a threshold of time to be "substantially" entering the viewport.

A more sophisticated version of the invention includes a message transformation and disposition apparatus (transformer) that retrieves message metadata and body content from a message server to generate a message précis, with recipient's disposition store that contains recipient's previous message dispositions and time-to-disposal (TTD).

The user may have considered this message or a similar message before. So, the prior disposition data is used by a circuit that upon receiving the message metadata, determines a proposed TTD and a proposed disposition when recipient has recently disposed a similar message.

A timer is initialized by the instrumented viewport to the proposed TTD and a circuit performs the proposed disposition when the timer matures.

The invention is easily distinguished by transforming a message into a précis which includes a thumbnail reduced size image derived from a video or a soundbite along with a proposed TTD and a proposed disposition.

The invention is easily distinguished by transforming a message into a précis which includes a text string excerpted from a message body along with a proposed TTD and a proposed disposition.

The beneficial objective of the present invention is to assist a user in traversing through non-malicious, well-meaning, but overwhelming volumes of messages by learning from the recipient's behaviors his or her preferences and applying rules which mimic the recipient's personal attitudes. The invention reduces a user's effort in scanning through messages. Action or inaction can be configured as default proposals from analyzing the characteristics and content of the message and the history between a sender and a recipient. From prior user mail handling behaviors, a circuit predicts a most likely recipient action on an incoming message. A presentation viewport presents the predicted/proposed action in a viewport along with a message précis.

In one embodiment, when a user views some portion of the message and the proposed action and does nothing more, the proposed action is scheduled. When the user chooses an action different from the predicted action in response to the message, the circuit develops a pattern to better match the characteristics of another message in a future disposition prediction. Continuous machine learning reduces the error rate in prediction and increases the percent of time the user views an incoming message and accepts the proposed action.

The apparatus is easily distinguished from conventional spam filtering by the display of a proposed action based on a user's treatment of similar messages or related messages which is applied when the user allows a timer to expire. The apparatus is easily distinguished from auto-reply because it suspends action until the recipient has an opportunity to override or customize the proposed response.

The techniques described herein can be implemented in digital electronic circuitry, or in computer hardware, firmware, software, or in combinations of them. The techniques can be implemented as a mobile device, i.e., firmware tangibly embodied in a non-transitory medium, e.g., in a machine-readable storage device, for execution by, or to control the operation of circuit apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and connected by a wireless network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A system that comprises:
   a navigator apparatus that enables a movement of a selected message into or out of an instrumented viewport, the instrumented viewport being a defined section within the navigator in which a content and associated data of the selected message can be viewed by a user; and,
   a transformer apparatus that:
   (i) generates a proposed disposition for the selected message, the proposed disposition indicating a dispositive action that is automatically executed against the selected message at an expiry of a timer;
   (ii) generates a proposed time-to-disposal (TTD) for the selected message, the proposed TTD indicating a future date and a future time at which the proposed disposition of the selected message is automatically executed absent dispositive intervention by the user, wherein the expiry of the timer comprises the future date and the future time of the proposed TTD;
   (iii) displays both (a) the proposed disposition and (b) proposed TTD together with the selected message within the instrumented viewport when the selected message is moved within the instrumented viewport;
   (iv) detects a time at which the selected message enters into the instrumented viewport;
   (v) in response to entry of the selected message into the instrumented viewport, automatically triggering an initialization of the timer that counts beginning at the time at which the selected message entered into the instrumented viewport up to the future date and the future time of the proposed TTD; and
   (vi) if the timer matures to the future date and the future time of the proposed TTD, automatically executing the proposed disposition for the selected message.

2. The transformer of claim 1 further comprises:
an interface circuit to retrieve a message body and headers from at least one message server;
a disposition store of recipient's previous message dispositions and time-to-disposals (TTDs), where each of the TTDs indicate an amount of time that a user spent interacting with a previous message prior to performing a dispositive action;
a predictor circuit to propose a most likely disposition and most likely TTD by closest match of a retrieved message with a similar message in disposition store using sender id, Internet Protocol (IP) address, or domain; and,
a precis synthesizer circuit to transform message body and headers and the proposed TTD and the proposed disposition into a message precis.

3. The navigator of claim 1 further comprises:
a user interface to receive commands to perform selectable message archiving, deletion, message moving, message forwarding, message flagging, message opening, play, reply-to, and schedule that are recorded into disposition store and transmitted to a message server;
a user interface to receive commands to amend the proposed disposition and to amend the proposed TTD;
sensors to determine the time when the selected message entered or exited the instrumented viewport, and a time when a message was disposed; and,
a navigation control to scroll or pan message precis through the instrumented viewport.

4. The transformer of claim 2 further comprises:
a disposition recorder to write TTD and disposition into disposition store; and
an interface circuit to transmit a command to the message server to implement the proposed disposition at an earlier of an expiration date and the user causing the message disposition.

5. The transformer of claim 4 wherein a default disposition when no related history is contained in disposition store is quality of content by key word scores and machine learning of similar messages.

6. A system that comprises:
a message transformation and disposition apparatus (transformer) that retrieves message metadata and body content from a message server to generate a message precis, with recipient's disposition store that contains recipient's previous message dispositions and time to disposal (TTD), wherein the transformer comprises:
a circuit that upon receiving the message metadata, determines a proposed TTD and a proposed disposition when recipient has recently disposed a similar message, the proposed disposition indicating a dispositive action that is automatically executed against the selected message at an expiry of a timer, and wherein the proposed TTD indicating a future date and a future time at which the proposed disposition of the selected message is automatically executed absent dispositive intervention by the user, wherein the expiry of the timer comprises the future date and the future time of the proposed TTD; and,
a precis navigation and viewport control apparatus (navigator).

7. The system of claim 6 wherein a precis is a thumbnail reduced size low resolution image from a video or a soundbite generated by a circuit to transform a message.

8. The system of claim 6 wherein a precis is an image of a text string excerpted from a message body by a circuit to transform a message.

9. A system for message disposition acceleration by a recipient that comprises:
a message navigation and viewport control apparatus (navigator) that has an instrumented viewport to record disposition of messages and time from when each message first entered the viewport until each message is disposed;
a message transformation and disposition apparatus (disposer) that has a store of message dispositions and each time-to-disposition (TTD);
a circuit to read a store of message dispositions and TTD;
a circuit to store quality of content;
a circuit to generate a proposed TTD and to generate a proposed disposition based on (i) sender's prior relationship with recipient and (ii) recipient's history for similar messages, the proposed disposition indicating a dispositive action that is automatically executed against a message at an expiry of a timer, the proposed TTD indicating a future date and a future time at which the proposed disposition of the message is automatically executed absent dispositive intervention by the recipient, wherein the expiry of the timer comprises the future date and the future time of the proposed TTD, and;
and,
a circuit to propose a TTD and to propose a disposition based on recipient's history for similar messages.

10. The navigator of claim 9,
wherein the timer is launched when the instrumented viewport determines that the message has usefully entered the instrumented viewport; and
a circuit to perform the proposed disposition at the expiration of the proposed TTD absent intervention by the recipient.

11. The system of claim 9, wherein the message transformation and disposition apparatus further comprises:
a circuit to transform the message and metadata of the message into a message precis that contains a text string excerpt of a body of the message; and, wherein the instrumented viewport displays the message precis, the proposed TTD, and the proposed disposition.

12. The system of claim 9 wherein the message transformation and disposition apparatus further comprises:
a circuit to transform the message and metadata of the message into a message precis that contains one of a soundbite of an audio stream, a thumbnail of a video stream or an image, a logo, an avatar of a sender, and a sensation derived from the body of the message; and, wherein the instrumented viewport conveys the message precis, the proposed TTD, and the proposed disposition.

13. A method executable by a processor to perform steps for continuously improving a user's productivity in disposing of electronic messages:
accessing a message recipient's inbox at a message server;
copying and storing an message that is unread;
determining from characteristics of the message, a proposed action, and a proposed time to perform the proposed action after the user has first put the message in scope, the proposed action indicating a dispositive action that is automatically executed against the message at an expiry of a timer, and the proposed time indicating a future date and a future time at which the proposed action of the message is automatically executed absent dispositive intervention by the user, wherein the expiry of the timer comprises the future date and the future time of the proposed time;

displaying in a viewport a precis of the message, the proposed action and the proposed time when the proposed action will be scheduled after the message is first in scope;

observing when the user first places the message precis in scope in the viewport and starting the timer;

performing the proposed action when the timer completes unless the user intervenes by performing another action or adjusting the timer;

receiving a user command to adjust the timer;

improving a rule base with additional message characteristics, proposed actions, and timers.

14. The method of claim 13 wherein scope is determined by scrolling or navigating a panel of a display to expand, emphasize, or highlight the message.

15. A method for automated custom transformation of and response to received electronic messages, the method comprising performing at a processor:

presentation of proposed actions, responses, and triggers (ART) for a message;

observation of user intervention or acceptance of proposed ART, wherein observation of user intervention or acceptance of proposed ART comprises steps performed by a processor to cause:

determining that a message and its proposed ART have entered scope when the user has had sufficient visibility in a viewport to observe the excerpt and proposed actions, initiating a time/day trigger circuit to begin a countdown to launching the proposed action or response, suspending and restarting the time/day trigger circuit when a user intervenes to reset the time/day, suspending the time/day trigger circuit when a user intervenes to perform an action different from the proposed action or response, and performing the proposed action or response when inaction by the user allows the time/day trigger circuit to launch;

evaluation of content quality based on keyword scores; and machine learning from user intervention of more tightly tuned ART for a message profile.

16. The method of claim 15 wherein presentation of proposed actions, responses, and triggers (ART) for a message comprises steps performed by a processor to cause:

retrieving an electronic message from an inbox;

determining a message profile according to characteristics of the message including one or more of a sender name, a personal and business address book, external links embedded in the message, and a content of the message, reviewing a personal history of the user's mail sent or received, selecting from stored proposed actions, responses, and triggers as a most likely choice for the message profile by applying heuristics, and displaying in a user viewport a precis of the message and the selected proposed ART.

17. The method of claim 15 wherein machine learning of more tightly tuned ART for the message profile from user intervention in the viewport comprises steps performed by a processor to cause:

for each presented message that the user does not accept a proposed ART, storing a new time/day trigger which might be a local time of day, day of week, or elapsed time from the message first entering scope, storing a new action, response, or disposition for the message to be launched upon fulfillment of the trigger, and associating at least one of the new time/day trigger and ART with the message profile.

* * * * *